United States Patent [19]

Maier

[11] Patent Number: 5,853,187

[45] Date of Patent: Dec. 29, 1998

[54] SNOWMOBILE HITCH

[76] Inventor: James P. Maier, 2712 Mayhew Lake Rd. NE., Sauk Rapids, Minn. 56379

[21] Appl. No.: 755,482

[22] Filed: Nov. 22, 1996

[51] Int. Cl.[6] ...................................................... B60D 1/52
[52] U.S. Cl. ........................... 280/495; 280/500; 280/504; 280/491.5; 280/493; 280/24; 280/511
[58] Field of Search ..................................... 280/504, 511, 280/515, 508, 495, 491.1, 493, 491.5, 500, 18, 19, 24

[56] References Cited

U.S. PATENT DOCUMENTS

| | | | |
|---|---|---|---|
| 2,492,914 | 12/1949 | Barden | 280/500 |
| 2,726,098 | 12/1955 | Krengel | 280/500 |
| 2,889,155 | 6/1959 | Sandage | 280/491 |
| 3,318,617 | 5/1967 | Burns | 280/500 |
| 3,463,514 | 8/1969 | Warner | 280/495 |
| 3,560,013 | 2/1971 | Lee | 280/19 |
| 3,570,616 | 3/1971 | Tominaga | 180/5 |
| 3,578,358 | 5/1971 | Reynolds | 280/495 |
| 3,727,937 | 4/1973 | Maki, Jr. | 280/24 |
| 3,762,736 | 10/1973 | Johnson et al. | 280/24 |
| 3,781,038 | 12/1973 | Bachel et al. | 280/24 |
| 3,923,355 | 12/1975 | Erickson | 280/24 |
| 3,964,768 | 6/1976 | Reynolds | 280/495 |
| 4,032,170 | 6/1977 | Wood | 280/495 |
| 4,204,701 | 5/1980 | Oltrogge | 280/500 |
| 4,353,563 | 10/1982 | Foster | 280/24 |
| 4,738,464 | 4/1988 | Putnam | 280/500 |
| 5,143,393 | 9/1992 | Meyer | 280/495 |
| 5,277,448 | 1/1994 | Colibert | 280/491.5 |
| 5,441,294 | 8/1995 | Losier | 280/491.4 |
| 5,476,279 | 12/1995 | Klemetsen | 280/504 |
| 5,489,111 | 2/1996 | Collins | 280/495 |
| 5,511,813 | 4/1996 | Kravitz | 280/495 |

FOREIGN PATENT DOCUMENTS

WO 94/19205  9/1994  WIPO ................................ 280/491.5

*Primary Examiner*—Brian L. Johnson
*Assistant Examiner*—Gary Savitt
*Attorney, Agent, or Firm*—Moore & Hansen

[57] ABSTRACT

A snowmobile hitch has a U-shaped mounting bracket for mounting to the tunnel and grab bar of a snowmobile using existing bolt holes in the grab bar. The mounting bracket aerodynamically and aesthetically fits the snowmobile and does not protrude from the snowmobile except when a hitch is attached. A ball mount hitch is slidably received within a ball mount receiver of the mounting bracket, and may be readily attached and removed therefrom.

11 Claims, 2 Drawing Sheets

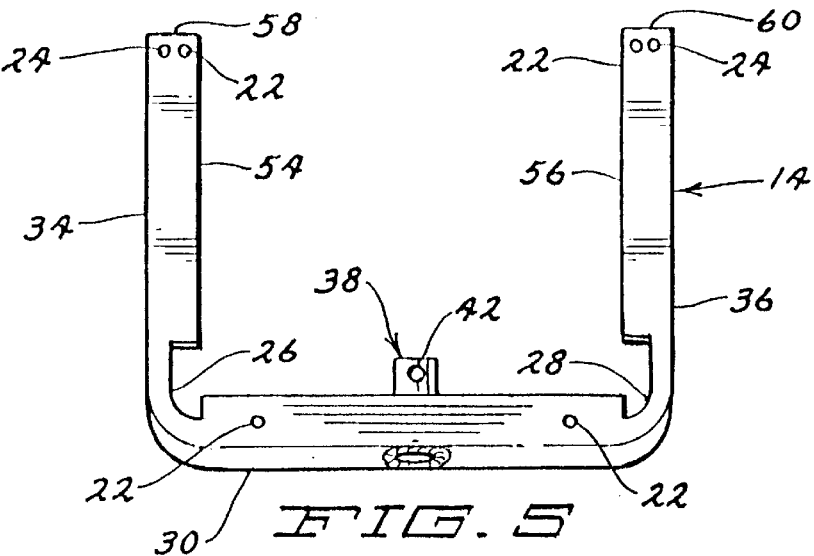
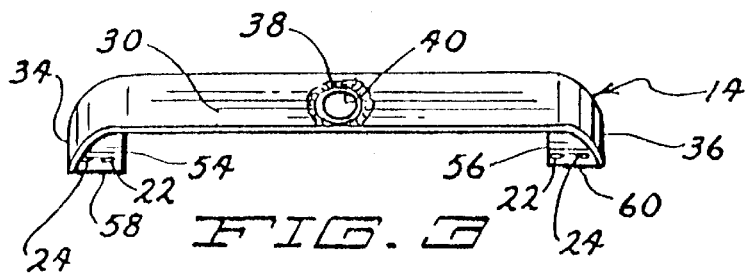
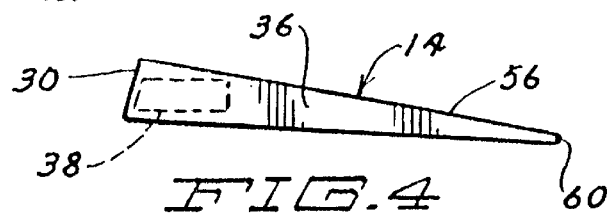
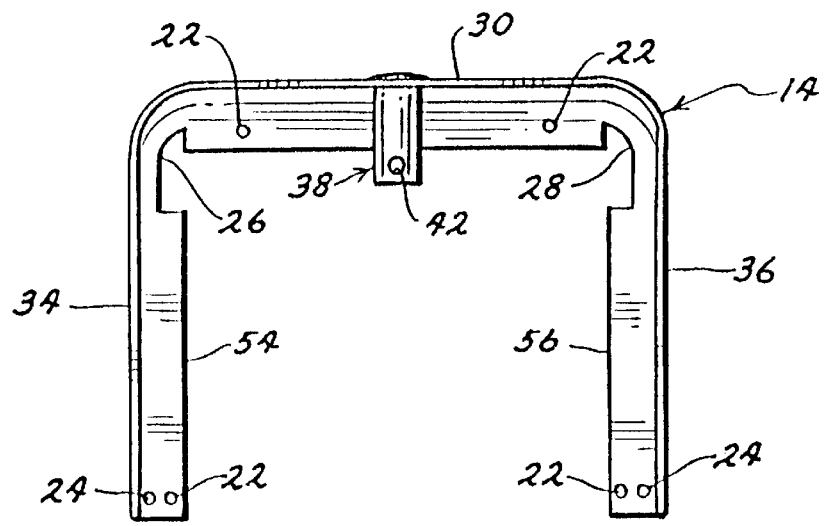

SNOWMOBILE HITCH

BACKGROUND OF THE INVENTION

The present invention relates to the field of hitches, and specifically to snowmobile hitches.

It is common to use snowmobiles for transportation and recreation during times of the year when snow is present. While snowmobiles provide excellent transportation, they do not offer much room for transport of cargo. To allow transport of cargo by snowmobiles, various hitches and towing mechanisms have been designed which allow a snowmobile to pull another snowmobile, a trailer, or other cargo transport behind the snowmobile.

Towing mechanisms and hitches for snowmobiles have traditionally been complicated, requiring much time and effort to install, maintain and operate. Further, towing mechanisms and hitches generally extend away from the snowmobile, detracting from its aerodynamics and aesthetics, as well as acting as an obstacle which a rider or other person may kick or run into, potentially damaging the hitch, but more likely injuring the person.

Additionally, towing mechanisms and hitches mount rather awkwardly to a snowmobile, and the forces associated with the towing of trailers and the like place stresses on parts of the snowmobile not intended to receive such stresses. Hitches of this sort may damage the snowmobile, or may lead to accidents or injury due to overworking the snowmobile or its parts.

For example, U.S. Pat. No. 3,463,514 discloses a trailer hitch assembly designed to mount to large sheet metal surfaces of a vehicle. Numerous mounting brackets are required to distribute towing forces over the surface of the vehicle. Snowmobiles do not have a large surface area over which to distribute a load. Such a hitch requires a large surface area on which to effect hitch mounting. The hitch extends away from the vehicle. Stresses incurred in a hitch of the designed disclosed in this patent would not be adequately borne if the hitch were employed on a snowmobile.

Another type of hitch known in the prior art is a hitch as disclosed in U.S. Pat. No. 3,964,768. This patent discloses a complex hitch assembly which mounts to a vehicle and distributes the total load. This assembly extends from the vehicle and is subject to the same problems as other hitches that extend from vehicles. This hitch also requires extensive mounting procedures including tension arms and the like.

Other hitches, such as flip flop hitches, allow too much slack between the snowmobile and the object being towed, and have a tendency therefore to jerk and not be able to smoothly tow a load. Also, due to the nature of the hitch, they tend to freeze up and become useless. Nuts and bolts holding a flip flop hitch together have a tendency to come loose with the repeated jarring motion imparted due to the nature of the hitch. The bolts may come loose during towing, and become lost or cause an accident.

Due to the structure and size of a snowmobile, a hitch attached to the snowmobile may generally weaken the structure of the snowmobile, by extending from the snowmobile, and mounting to portions of the snowmobile which do not accept stresses well. It would be desirable to provide a snowmobile hitch that structurally strengthened a snowmobile.

It would also be desirable to provide a snowmobile hitch which may be mounted flush with the snowmobile in order to avoid the problems of hitches which extend from the snowmobile.

It would also be desirable to provide a snowmobile hitch which mounts simply to a snowmobile, and which does not require extensive modification of the snowmobile, or inflict potentially weakening damage of the snowmobile by its mounting.

BRIEF SUMMARY OF THE INVENTION

The present invention overcomes the problems of the prior art by providing a snowmobile hitch which when mounted to a snowmobile strengthens the snowmobile structure, as well as mounting substantially flush to the snowmobile. The present invention is a unitary frame mounted snowmobile hitch, which includes a U-shaped mounting bracket and a removable ball mount. The removable ball mount is attached when towing is required, and can be readily and easily removed after towing. The U-shaped mounting bracket has mounting holes corresponding to existing holes in the tunnel of a snowmobile, and may be attached to the snowmobile mostly by using the existing bolts and holes, which reduces the amount of effort and time required to mount the hitch, and minimizes the amount of modification of the snowmobile required by the user. Extra mounting holes may be used to provide further stability of the mount.

The U-shaped mounting bracket is notched at its inside corners to fit a snowmobile. The mounting bracket is thickest in height at the base or closed end of the U which will be positioned substantially flush with the rear of the snowmobile. The side arms of the mounting bracket are tapered toward the front of the snowmobile to their narrowest point at the open end of the U. When the mounting bracket is positioned on a snowmobile, it fits substantially flush with the rear and sides of the snowmobile under the grab bar and along the sides.

Near the center of the base or closed end of the U, a ball mount receiver will accommodate the removable ball mount machined to be fit with a ball or a pin. The ball mount may be made of round or square stock. The ball mount receiver may be a section of round or square hollow stock sized to be just slightly larger than the shaft of the ball mount, so that the shaft will fit snugly within the receiver. A fastener opening is provided on the ball mount receiver or adjacent the ball mount opening so that the ball mount may be attached and removed readily without detaching the hitch.

The mounting bracket may be formed of angle iron or other suitably strong material and adds strength and stability to the rear of the snowmobile. Additionally, the mounting bracket fits substantially flush with the rear and sides of the snowmobile, and accordingly, contributes no significant drag effect to the aerodynamics of the snowmobile. The ball mount, when not in use, can be removed so that the hitch does not protrude in any way from the snowmobile, thereby lessening the likelihood of injury due to contact with the hitch.

The mounting of the ball mount directly to the mounting bracket, which in turn is mounted to the snowmobile frame, allows a direct solid connection between the snowmobile and the object being towed if it is properly equipped with a hitch accepting mount. This eliminates the problem of freeze up and excess slack present in many prior art hitches.

These any other objects and benefits of the present invention will become apparent from the following detailed description thereof taken in conjunction with the accompanying drawings, wherein like reference numerals designate like elements throughout the several views.

BRIEF DESCRIPTION OF THE DRAWINGS

FIG. 3 is a rear elevation view of the mounting bracket shown in FIG. 2;

FIG. 4 is a side elevation view of the mounting bracket shown in FIG. 2;

FIG. 5 is a top elevation view of the mounting bracket shown in FIG. 2; and

FIG. 6 is a bottom elevation view of the mounting bracket shown in FIG. 2.

DESCRIPTION OF THE PREFERRED EMBODIMENT

Figure 1:
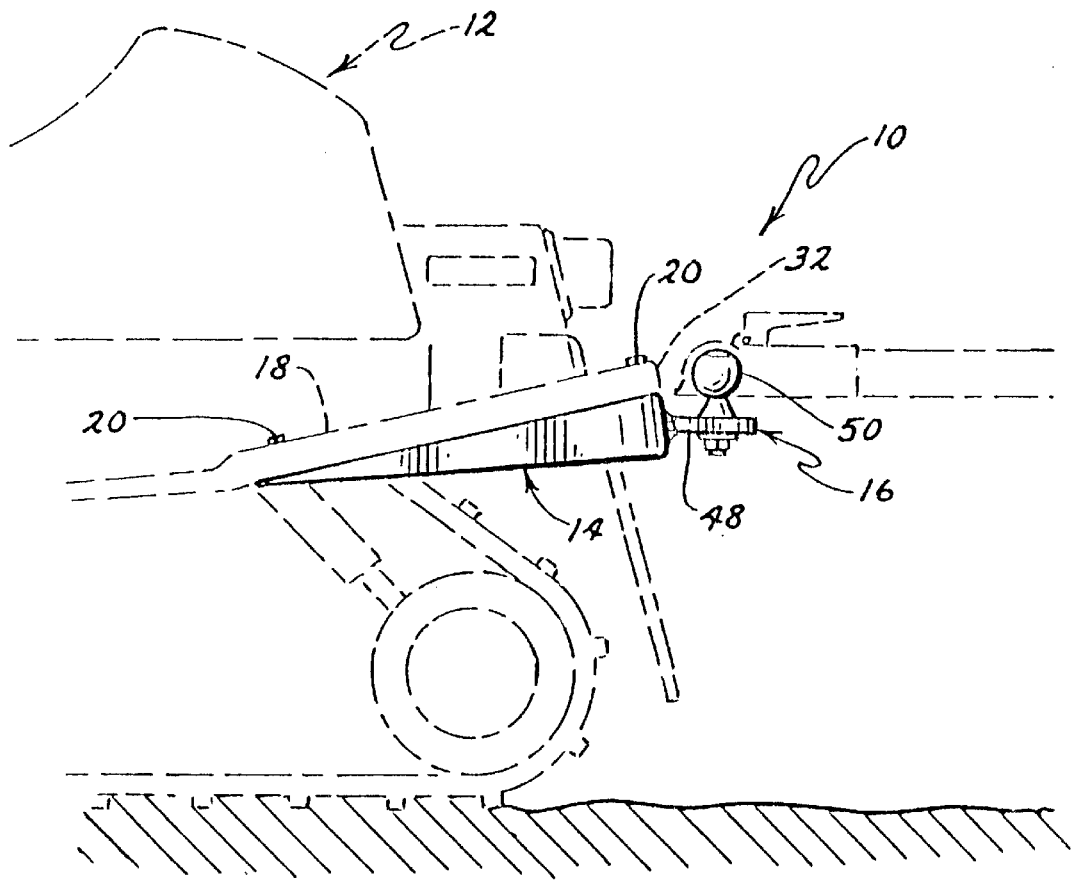
FIG. 1 is a perspective view of an embodiment of the snowmobile hitch mounted on a typical snowmobile.
Figure 2:
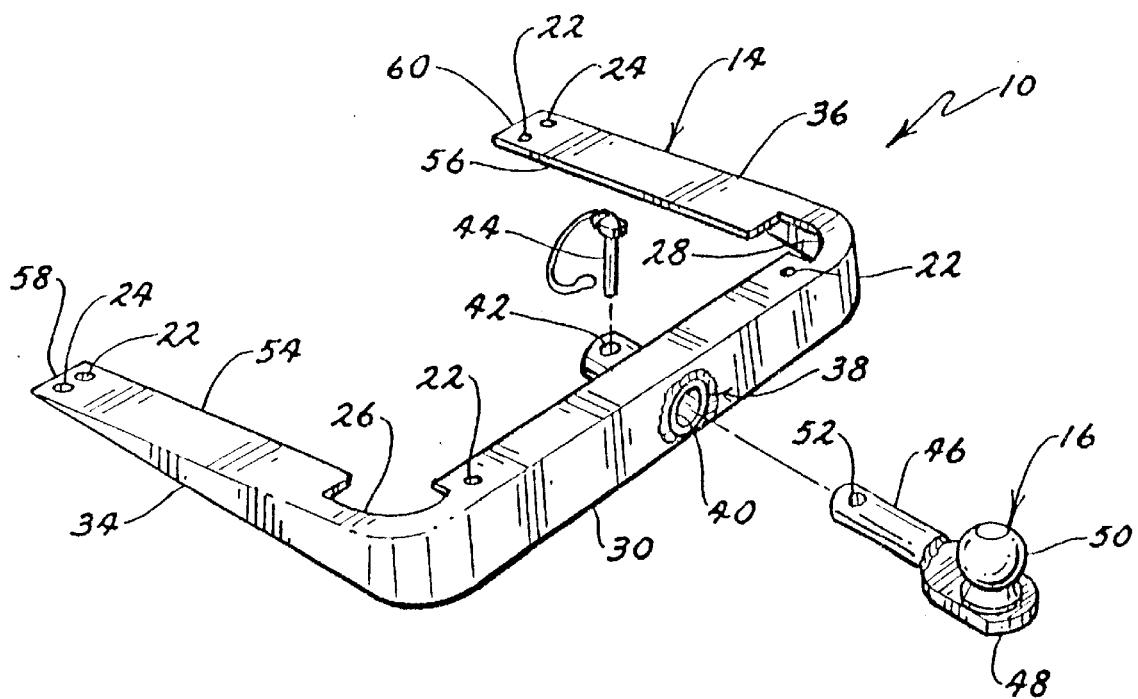
FIG. 2 is a partially exploded perspective view of an embodiment of the mounting bracket and removable ball mount of the present invention.

Referring now to the drawings, the snowmobile hitch 10 may be seen on a typical snowmobile 12. Snowmobile hitch 10 includes a U-shaped mounting bracket 14 and removable ball mount 16. U-shaped mounting bracket 14 is mounted to the tunnel and grab bar 18 of snowmobile 12 using bolts 20, which serve to attach mounting bracket 14 to the tunnel and grab bar 18 of snowmobile 12 through bolt holes 22 and 24 on mounting bracket 14.

Mounting bracket 14 of snowmobile hitch 10 has mounting holes 22 and 24 corresponding to existing holes (not shown) on the tunnel (not shown) of snowmobile 12, so that existing holes in the tunnel may be used to assist in mounting bracket 14 to snowmobile 12. Holes 22 on the closed end of mounting bracket 14 may be added to further secure mounting bracket 14 to snowmobile 12. When using holes 22 on the closed end of the hitch additional holes are drilled through grab bar 18 of snowmobile 12 to mount mounting bracket to the tunnel of the snowmobile for added support and strength. Holes 22 and 24 near rear edge 32 of snowmobile 12 correspond to existing holes in the tunnel and grab bar 18. Mounting bracket 14 is therefore mounted to the tunnel of the snowmobile at its open end and to the grab bar near its closed end.

Mounting bracket 14 has notches 26 and 28 which are shaped to fit the snowmobile 12. Mounting bracket 14 mounts to grab bar 18 and tunnel (not shown) and is mounted so that its rear edge 30 at the closed end or base of the mounting bracket 14 is substantially flush with rear edge 32 of grab bar 18 and so that its side edges 34 and 36 are substantially flush with the sides of the snowmobile 12.

Mounting bracket 14 is preferably constructed from angle iron, but any material of sufficient strength and rigidity may be used. Other acceptable materials include but are not limited to other metals, plastics, and the like.

Mounting bracket 14 has ball mount receiver 38 positioned substantially centrally on the closed edge 30 of the U of U-shaped mounting bracket 14. Ball mount receiver 38 is preferably formed from round or square stock and is welded to mounting bracket 14. To accomplish this positioning, an opening 40 must be made in mounting bracket 14 to accommodate ball mount receiver 38. Ball mount receiver 38 has locking pin opening 42 which is designed to receive locking pin 44, which may be a cotter pin or other suitable locking pin which will fit locking pin opening 42. Alternatively, ball mount receiver 38 may simply be an opening such as opening 40 in mounting bracket 14.

Ball mount 16 includes ball mount shaft 46, ball mount plate 48, and ball 50. Alternatively, ball 50 may be replaced by a pin as is known in the art. Ball mount shaft 46 is sized to snugly fit ball mount receiver 38. Shaft 46 and ball mount receiver 38 may both be round or square stock provided that the stocks match. Shaft pin opening 52 aligns with locking pin opening 42 in ball mount receiver 38, allowing locking pin 44 to be placed therethrough to lock ball mount 16 to mounting bracket 14. Ball 50 is held to ball mount plate 48 by suitable means, which may include welding or bolting as is known in the art. In this way, ball mount 16 is removable from mounting bracket 14 without removing the entire snowmobile hitch 10 from a snowmobile 12. When ball mount 16 is removed from mounting bracket 14, the hitch is flush with the snowmobile.

The arms 54 and 56 of U-shaped mounting bracket 14 which extend toward its open end taper gradually from their thickest point at edge 30 of mounting bracket 14 to their thinnest point at respective ends 58 and 60 of arms 54 and 56. This tapering allows mounting bracket 14 to be aerodynamically and aesthetically mounted to snowmobile 12.

Mounting bracket 14 attaches to grab bar 18 and tunnel of snowmobile 12. Grab bar 18 is mounted to the tunnel or the frame of snowmobile 12. Mounting bracket 14, which as has been mentioned is preferably angle iron, adds strength and stability to snowmobile 12.

Since snowmobiles made by different manufacturers have slightly different configurations of bolt holes, tunnels, and grab bars, the mounting bracket 14 may be modified slightly to aesthetically and aerodynamically fit each snowmobile. Accordingly, the mounting bracket 14 may be modified by changing its dimensions, and the arrangement of mounting openings 22 and 24 and of notches 26 and 28, without departing from the scope of the invention. The mounting bracket 14 is readily modifiable to be used with all different types of snowmobiles from different manufacturers.

The detailed description outlined above is considered to be illustrative only of the principles of the invention. Numerous changes and modifications will occur to those skilled in the art, and there is no intention to restrict the scope of the invention to the detailed description. The preferred embodiments of the invention having been described in detail the scope of the invention should be defined by the following claims.

what is claimed is:

1. A snowmobile hitch comprising:

a U-shaped mounting bracket formed from one piece in unitary construction defined by a closed end having a rear edge and a rearward facing surface and by two mounting arms having side edges, with the closed end extending between the two mounting arms forming a substantially vertical U-shaped outer wall with the arms, each of said mounting arms and said closed end having a top surface projecting inwardly and projecting substantially horizontally from said U-shaped outer wall and wherein the top surface and the U-shaped outer wall form a substantially inverted L-shaped structure on all three sides of the mounting bracket and whereby the top surface overhangs a hollowed-out interior on all three sides of the mounting bracket and wherein the mounting bracket has only one substantially vertical wall and wherein the only substantially vertical wall of the mounting bracket is the U-shaped outer wall and wherein the substantially inverted L-shaped structure allows the mounting bracket to be mounted substantially flush with the sides and rear of the snowmobile; and, means for receiving a ball mount comprising an opening extending through the rearward facing surface of the closed end and a hollow stock receiver attached to the opening, wherein said opening and hollow stock receiver form a passage through the closed end, projecting forwardly therefrom substantially parallel to said arms; and, a ball mount having a ball mount shaft which removably and snugly engages said ball mount receiving means and hitching means attached to said ball mount.

2. A snowmobile hitch as described in claim 1, wherein said hitching means is a ball.

3. A snowmobile hitch as described in claim 1, wherein said hitching means is a pin.

4. A snowmobile hitch as described in claim 1, wherein said ball mount shaft and said ball mount receiving means are round.

5. A snowmobile hitch as described in claim 1, wherein each said mounting arm is tapered from a thickest point at said closed end to a narrowest point at the forward end of said arm.

6. A snowmobile hitch as described in claim 1, wherein said mounting bracket has a pair of spaced apart notches shaped to be engageable with a snowmobile grab bar.

7. A snowmobile hitch as described in claim 1, wherein said mounting bracket has mounting openings alignable with existing openings in a snowmobile, whereby said mounting bracket is mountable to a snowmobile with no modification to the snowmobile.

8. A snowmobile hitch for a snowmobile having a frame, a grab bar with a rear edge and sides, existing bolts, and existing bolt holes, comprising:

a U-shaped mounting bracket formed of one piece in unitary construction having a closed end with a rear edge and two arms with side edges, one arm extending from each end of said closed end so as to form a U-shaped, substantially vertical outer wall, said closed end and said arms each having a top surface projecting inwardly and projecting substantially horizontally from said U-shaped outer wall and wherein the top surface and the U-shaped outer wall form a substantially inverted L-shaped structure on all three sides of the mounting bracket and whereby the top surface overhangs a hollowed-out interior on all three sides of the mounting bracket and wherein the mounting bracket has only one substantially vertical wall and wherein the only substantially vertical wall of the mounting bracket is the U-shaped outer wall and wherein the substantially inverted L-shaped structure allows the mounting bracket to be mounted such that the U-shaped outer wall is substantially flush with the grab bar, said closed end further having a rearward facing surface, wherein said rearward facing surface forms part of the U-shaped outer wall, said mounting bracket further having mounting openings aligned with the existing bolts of the snowmobile, whereby said mounting bracket is mountable to the snowmobile frame using the existing bolt holes and bolts, said mounting bracket having means for receiving a ball mount substantially centrally located at the closed end of said mounting bracket, said means for receiving a ball mount comprising an opening in the rearward facing surface of the closed end and a hollow stock receiver attached to the opening, wherein said opening and hollow stock receiver form a passage through the closed end that projects forwardly therefrom substantially parallel to said arms;

a ball mount having a ball mount shaft sized to snugly fit within said ball mount receiving means, and hitching means attached to said ball mount.

9. A snowmobile hitch as described in claim 8, and further comprising:

a locking pin; and wherein said ball mount shaft has a first locking pin opening extending therethrough; and said hollow receiver has a second locking pin opening therethrough, said second locking pin opening aligning with said first locking pin opening when said ball mount shaft is engaged with said hollow receiver, said locking pin extending through said first and said second locking pin openings so as to detachably hold said ball mount in said hollow receiver.

10. A snowmobile hitch as described in claim 8, wherein each said mounting arm is tapered from a thickest point at said closed end to a narrowest point at the forward end of said arm such that there are substantially no abrupt protrusions extending either downwardly, or outwardly from the forward end of the arms.

11. A snowmobile hitch as described in claim 10, wherein said hitch is shaped to conform to the shape of the grab bar and frame of a snowmobile such that the hitch is mountable to the snowmobile without requiring the making of any modifications to the frame of the snowmobile.

* * * * *